(12) United States Patent
Yamada et al.

(10) Patent No.: US 9,112,779 B2
(45) Date of Patent: Aug. 18, 2015

(54) NETWORK SYSTEM

(75) Inventors: Masaki Yamada, Yokohama (JP); Yuji Ogata, Saitama (JP); Nobuyuki Muranaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 13/435,537

(22) Filed: Mar. 30, 2012

(65) Prior Publication Data

US 2012/0250528 A1 Oct. 4, 2012

(30) Foreign Application Priority Data

Apr. 4, 2011 (JP) ................................. 2011-082402

(51) Int. Cl.
*H04L 12/26* (2006.01)

(52) U.S. Cl.
CPC ................... *H04L 43/0817* (2013.01)

(58) Field of Classification Search
CPC ....................................................... H04L 12/56
USPC .......................................................... 370/250
See application file for complete search history.

(56) References Cited

U.S. PATENT DOCUMENTS

| | | | | |
|---|---|---|---|---|
| 2006/0274760 A1* | 12/2006 | Loher | ...................... | 370/395.52 |
| 2007/0022327 A1 | 1/2007 | Otsuka et al. | | |
| 2009/0080501 A1* | 3/2009 | Kim | .............................. | 375/211 |
| 2010/0148940 A1* | 6/2010 | Gelvin et al. | ............ | 340/286.02 |
| 2011/0134756 A1* | 6/2011 | Park et al. | ..................... | 370/238 |

FOREIGN PATENT DOCUMENTS

JP 2007-26303 A 2/2007

OTHER PUBLICATIONS

Aoki, Hidetaka et al., "Cloud Architecture for Tight Interaction With the Real World and Deep Sensor-Data Aggregation Mechanism", SoftCOM, 2010, 56-27882-2309 (five (5) pages).

* cited by examiner

*Primary Examiner* — Man Phan
*Assistant Examiner* — Nourali Mansoury
(74) *Attorney, Agent, or Firm* — Crowell & Moring LLP (57) ABSTRACT

In a network system in which a large number of terminals that transmit information exist and data extraction is performed via a wide area network, when data filtering is performed by using terminals called entrance nodes, existing in front of the wide area network, efficient operation of the entrance nodes is a goal to achieve. In one implementation, when an entrance node has detected an alteration to a configuration of diverse resources attached to it, it updates management information by communicating with other entrance nodes existing in the neighborhood. In a further implementation, through a query and reply exchange about allocations of filtering and quick response processes to be executed by entrance nodes, reallocating process items, pre-filtering of necessary data, and relaying data between entrance nodes are performed.

10 Claims, 9 Drawing Sheets

| SENSOR DESIGNATION 610 | SENSOR TYPE 620 | CONNECTION PORT 630 | IP ADDRESS 640 | DESTINATION 650 | PROCESS ITEM 1 660 | PROCESSING NODE 1 670 | PROCESS ITEM 2 680 | PROCESSING NODE 2 690 |
|---|---|---|---|---|---|---|---|---|
| SENSOR 1 | TEMPERATURE | 1 | 192.168.xx.11 | 100.xx.xx.1 | AVERAGING 1 | EN1 | TIME AVERAGE 1 | EN1 |
| SENSOR 2 | TEMPERATURE | 2 | 192.168.xx.12 | 100.xx.xx.1 | AVERAGING 1 | EN1 | TIME AVERAGE 2 | EN1 |
| SENSOR 3 | TEMPERATURE | 3 | 192.168.xx.13 | 100.xx.xx.1 | AVERAGING 1 | EN1 | TIME AVERAGE 3 | EN1 |
| SENSOR 4 | TEMPERATURE | 4 | 192.168.xx.14 | 100.xx.xx.1 | AVERAGING 1 | EN1 | TIME AVERAGE 4 | EN1 |
| SENSOR 5 | HUMIDITY | 5 | 192.168.xx.15 | 100.xx.xx.2 | AVERAGING 2 | EN1 | | |
| SENSOR 6 | HUMIDITY | 6 | 192.168.xx.16 | 100.xx.xx.2 | AVERAGING 2 | EN1 | | |
| SENSOR 7 | HUMIDITY | 7 | 192.168.xx.17 | 100.xx.xx.2 | AVERAGING 2 | EN1 | | |
| SENSOR 8 | HUMIDITY | 8 | 192.168.xx.18 | 100.xx.xx.2 | AVERAGING 2 | EN1 | | |
| SENSOR 9 | VIBRATION | 1 | 192.168.xx.19 | | COMPRESSION 1 | EN1 | ABNORMALITY DETECTION 1 | EN2 |
| SENSOR 10 | VIBRATION | 2 | 192.168.xx.20 | | COMPRESSION 2 | EN1 | ABNORMALITY DETECTION 2 | EN2 |
| SENSOR 11 | VIBRATION | 3 | 192.168.xx.21 | | COMPRESSION 3 | EN1 | ABNORMALITY DETECTION 3 | EN3 |
| SENSOR 12 | VIBRATION | 4 | 192.168.xx.22 | | COMPRESSION 4 | EN1 | ABNORMALITY DETECTION 4 | EN3 |

| PROCESS NO. 1010 | PROCESS ITEM 1020 | SENSOR 1030 | TASK TO BE READ 1040 | STORED DATA 1050 | EXECUTION PERIOD 1060 | LOAD 1070 | MOVABILITY 1080 | DESTINATION 1090 |
|---|---|---|---|---|---|---|---|---|
| 1 | AVERAGING 1 | SENSOR 1, SENSOR 2 | heikin_1.exe | heikin1.dat | 1 min | 10 | NO | 10.xx.xx.1 |
| 2 | AVERAGING 2 | SENSOR 3, SENSOR 4 | heikin_1.exe | heikin2.dat | 1 min | 10 | NO | 10.xx.xx.1 |
| 3 | AVERAGING 3 | SENSOR 1, SENSOR 2, SENSOR 3, SENSOR 4, SENSOR 5 | heikin_10.exe | heikin3.dat | 10 min | 15 | YES | 10.xx.xx.2 |
| 4 | COMPRESSION 1 | SENSOR 1 | compress.exe | com1.dat | 10 sec | 4 | YES | 10.xx.xx.3 |
| 5 | COMPRESSION 2 | SENSOR 2 | compress.exe | com2.dat | 10 sec | 4 | YES | 10.xx.xx.4 |
| 6 | COMPRESSION 3 | SENSOR 3 | shortcom.exe | com3.dat | 1 sec | 40 | YES | 10.xx.xx.3 |
| 7 | COMPRESSION 4 | SENSOR 4 | packetcom.exe | com4.dat | PACKET | 100 | NO | 10.xx.xx.4 |

NETWORK SYSTEM

CLAIM OF PRIORITY

The present application claims priority from Japanese patent application JP2011-82402 filed on Apr. 4, 2011, the content of which is hereby incorporated by reference into this application.

BACKGROUND OF THE INVENTION

The technical field of the present invention relates to a communication system, in particular, a monitoring system that monitors communication contents at a network node.

Along with the dissemination of networks, a large-scale network system is under consideration with the aim of mutually sharing information for plural network systems and creating new values. In such a large-scale network system, due to growing network traffic and more complicated applications, current network nodes have been provided with the capability of implementing more highly functional processes, as set forth in Japanese Patent Application Laid-Open Publication No. 2007-26303, besides the ability of simple packet forwarding.

As an example of using network nodes that carry out highly functional processes, a network that realizes quicker response by having computational processing performed by a processing entity in a network between user terminals and a data center is under consideration. As an example of this type of network, there is a cloud-type network as set forth in Hidetaka Aoki, Hiroaki Shikano et al. "Cloud Architecture for Tight Interaction with the Real World and Deep Sensor-Data Aggregation Mechanism", 36-27882-2309 SoftCOM 2010. Highly functional network nodes constituting the cloud-type network realize efficient traffic handling and the execution of computational processing on behalf of a processing entity in the network by performing filtering processing and computational processing on data destined toward the data center.

Highly functional network nodes are located at end points of a wide area network and perform monitoring and filtering of traffic, thereby transmitting data only required for a higher level system onto the wide area network, thus reducing the load of the wide area network. The highly functional network nodes serving as above, located at the end points of the wide area network, are called entrance nodes. Moreover, in this network system, substitutive execution of a part of computational processing by the entrance nodes enables the realization of response in a shorter time, dispensing with communication via the wide area network.

In order to realize traffic monitoring and filtering, as noted above, or quick response processing for achieving a shorter response time by substitutive execution of a part of computational processing, an entrance node performs the management of terminals attached to it and the management of its own resources. Each entrance node holds, for example, information about which entrance node is connected to which end nodes, the end nodes having sensors that transmit data and operating actuators, and information about which entrance node is responsible for filtering processing on traffic transmitted by the end nodes. Transversal management of such items of information is performed in such a way that an administrative server existing on a higher level communicates with plural entrance nodes transversally.

BRIEF SUMMARY OF THE INVENTION

In traditional networks, connections between an entrance node and its attached nodes are statically configured. In a case that these nodes moves, the administrative server collects information about new connection destinations to which the nodes moved and traces moved terminals by a method such as updating management information on both a destination entrance node to which they moved and a source entrance node from which they moved. Consequently, in traditional network systems, there is a first problem; when an alteration is made to the connections between an entrance node and its attached nodes connected to the entrance node, that is, the locations and connection destinations of the attached nodes, because of physical movement of some nodes, load may be concentrated on the administrative server, so that the sever cannot cope with the alteration sufficiently.

Further, there is a second problem. A traditional entrance node only performs filtering processing on information transmitted from terminals managed by it. When terminals managed by entrance nodes relocate, processing may be concentrated on a particular entrance node. One entrance node may experience a decrease in processing speed or cannot handle all requests due to overload, whereas another entrance node may have nothing to be processed and waste its computational performance.

To address at least any one of the above two problems, in one aspect of the present invention, the following steps are performed. A network node, upon receiving a packet, decides whether it holds information about the packet. If the network node does not hold this information, it sends a query to some other entrance node and determines a process item in the packet. According to this determination, the network node transfers the packet to some other entrance node and entrusts a computational process to the some other entrance node or the network node executes the computational process by itself and transfers a result of the processing.

According to one aspect of the present invention, packet transfer processing can be performed efficiently.

DETAILED DESCRIPTION OF THE INVENTION

First Embodiment

Figure 1:
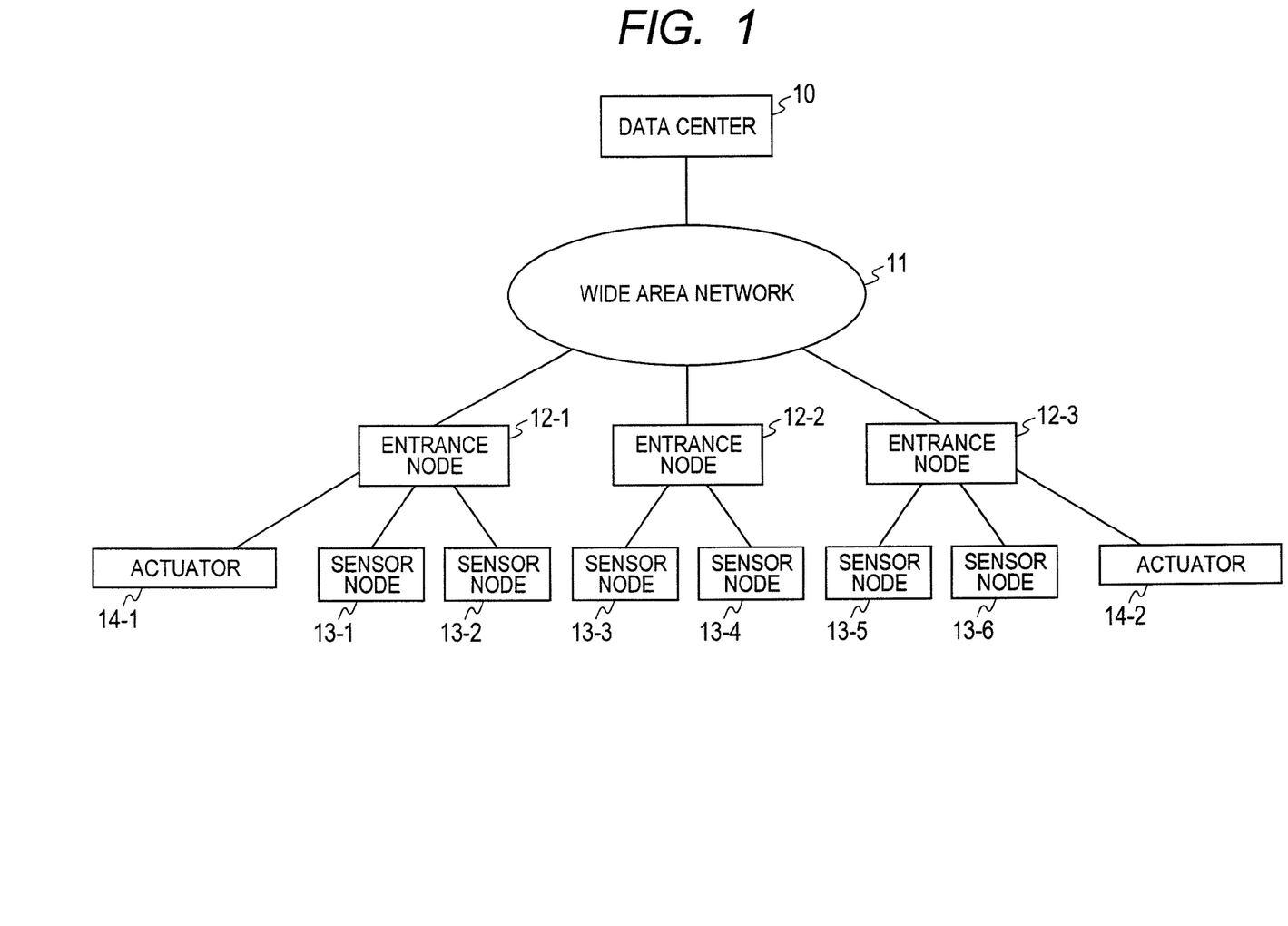
FIG. 1 is a diagram of a network system using entrance nodes.

One embodiment for carrying out the present invention is shown in FIG. 1.

A network system of the present exemplary embodiment is a system that uses a wide area network connecting plural companies' hubs and the like. The network system is composed of a data center (10), a wide area network (11), plural entrance nodes (12), plural sensor nodes (13), and plural actuators (14). In this network system, data generated from the plural sensor nodes 13 is collected to the data center 10 via the entrance nodes 12 and the wide area network 11 and the data is stored in a lump and subjected to computational processing or the like in the data center 10.

Plural sensor nodes 13 exist in each hub and there is a variety of types of sensors such as temperature sensors, humidity sensors, vibration sensors, pressure sensors, motion sensors, microphones, and cameras. The sensor nodes 13 and the entrance nodes 12 are connected, respectively, via wired or wireless communication lines.

The entrance nodes 12 are network nodes that are located at the entrances of the wide area network and communication devices that perform decision processing and computational processing functions besides switching and router functions. These entrance nodes 12 are installed per room, per floor, per building, and per hub, depending on the number of sensor nodes 13 attached to an entrance node, process items required to be executed by an entrance node, etc., besides the performance of an entrance node itself. Although it is not necessary that all the entrance nodes 12 have comparable performance, the entrance nodes 12 are in a parallel relationship, that is, they are not deployed such that one entrance node embraces an area managed by another entrance node. Therefore, three entrance nodes (shown in FIG. 1) each should have comparable performance.

An entrance node 12 is intended to manage sensor nodes connected to it, and to monitor transmission data transmitted by the sensor nodes and perform computational processing on the data. By data monitoring and computational processing as above, one purpose of the entrance node is to reduce traffic and reduce the load of the wide area network 11 by performing filtering processing which is a general term for computational processing such as compression, selective deletion, averaging, etc. of data to be transmitted onto the wide area network 11. Also, the entrance node has another purpose as noted below. If a quick response is required, the entrance node 12 gets a result of computational processing and sends various types of actuators 14 connected thereto a signal for operating these actuators. The reason for this is that the actuators 14 are operated according to a result of processing performed by the data center 10 in usual processing and, in this case, there is more delay for the time taken to transfer data to/from the data center.

Figure 6:
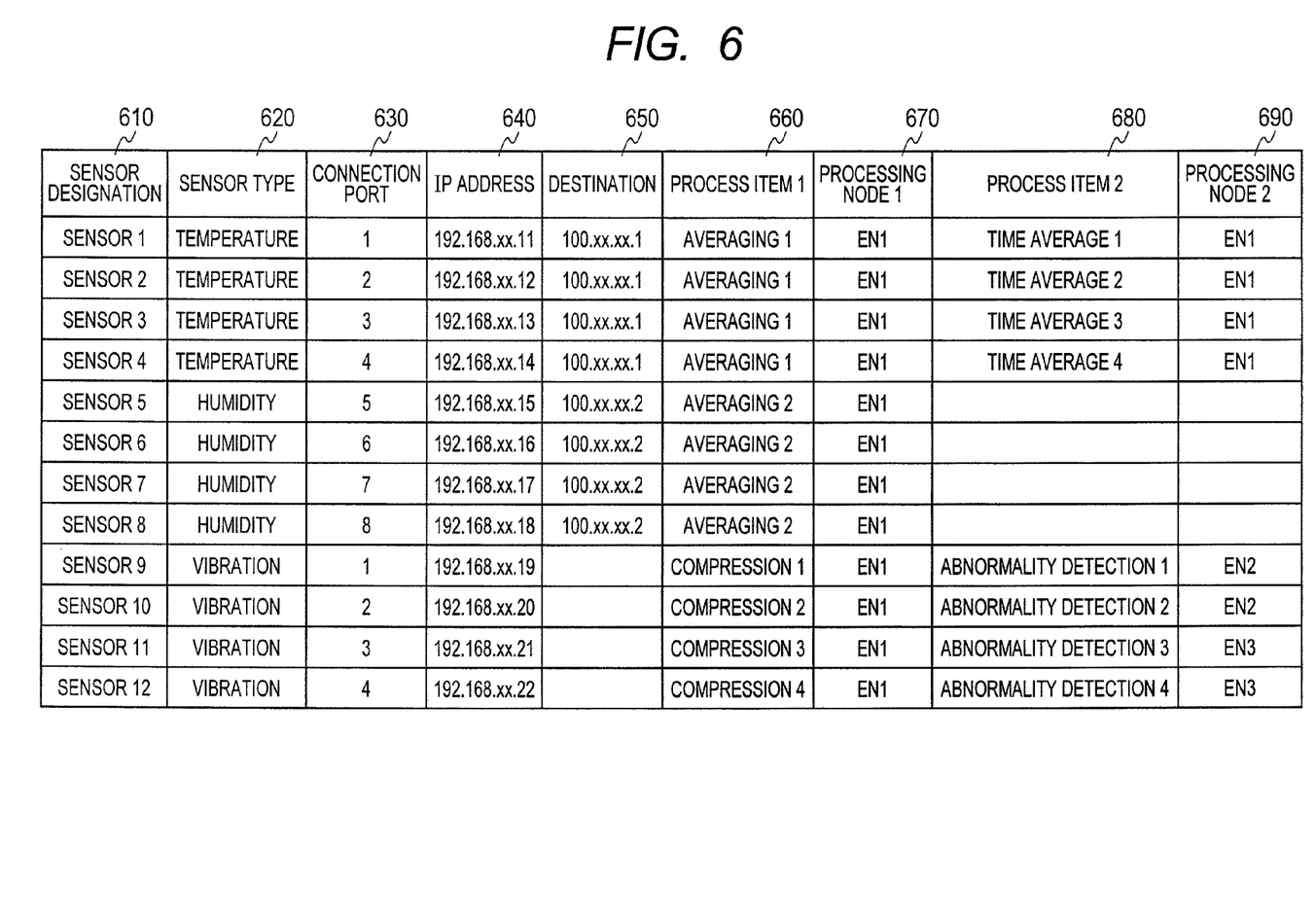
FIG. 6 is a diagram showing a sensor table of an entrance node.

An overview of a sensor management table that an entrance node 12 has for carrying out the above management is shown in FIG. 6. The sensor management table of the entrance node of the present exemplary embodiment includes information for management such as a unique designation 610 to identify a sensor and the type 620 of the sensor. A physical port 630 to which the sensor device is connected and its IP address 640 are used as information to identify the sensor. The table also includes the IP address of a server or the like in the data center 10 as a destination 650 to which information for the sensor is transmitted. Further, in the columns of process item 660 and processing node 670, information is specified for a process item 680 and an executing entity (processing node) 690 of computational processing which is performed by an entrance node.

Figure 2:
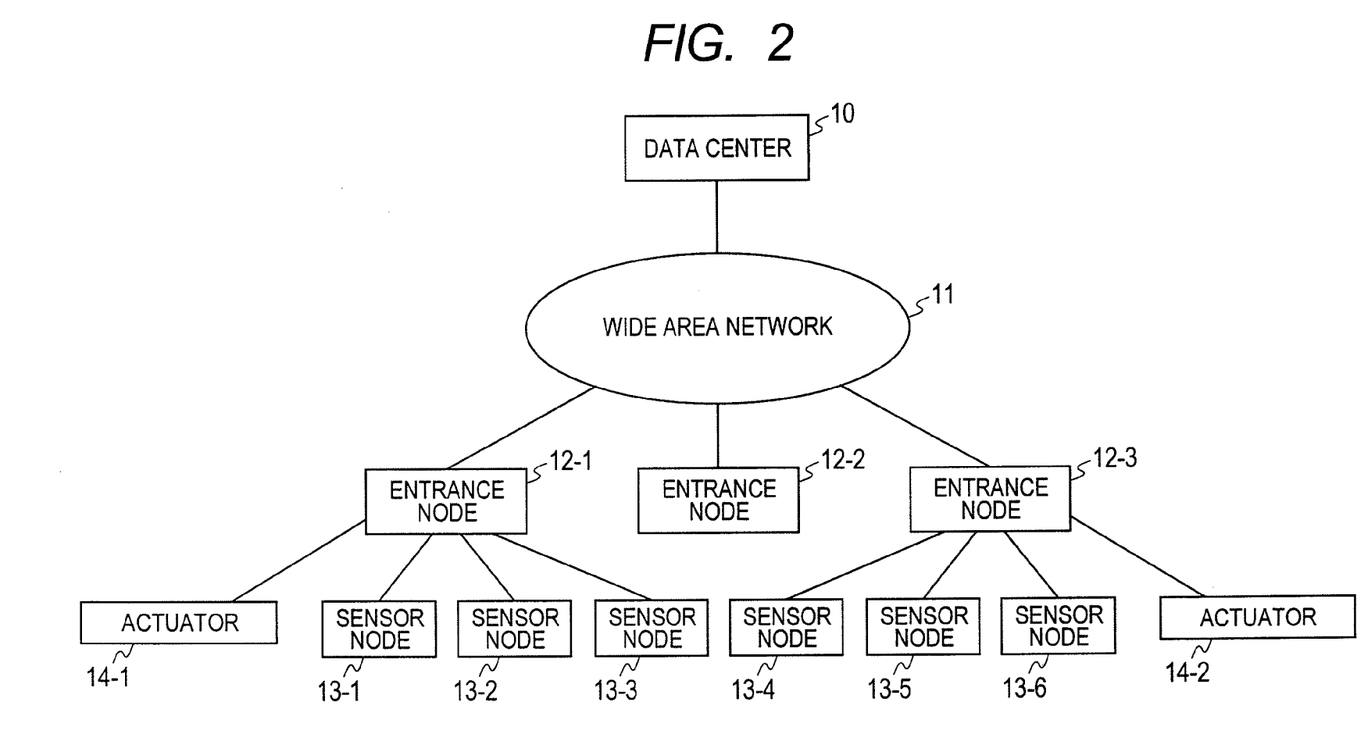
FIG. 2 is a diagram of a network system after terminals moved.

In a case where a sensor node moves, a behavior using the present exemplary embodiment is described below. FIG. 2 shows a configuration in a case where some sensor nodes moved from the state of FIG. 1. At this time, due to the movement of the sensor nodes, the entrance nodes to which they are connected alter. This assumes, for example, a case where three entrance nodes are installed in a distributed manner in a company's hub and machine tools equipped with the sensor nodes attached to the entrance nodes moved because of relocation for use.

In FIG. 2, a sensor node 13-3 is connected to an entrance node 12-1 and a sensor node 13-4 is connected to an entrance node 12-3. Thereby, there is no sensor node that is directly connected to an entrance node 12-2.

If such a situation occurs, operation in the present exemplary embodiment is based on a scheme that differs from the way in which an administrative server existing in the data center or the like copes with the management of the entrance nodes by updating the sensor node tables held by the entrance nodes and process items to be handled in an integrated fashion. Specifically, in an example of FIG. 2, the entrance node 12-1 becomes responsible for filtering processing for the sensor node 13-3 in addition to sensor nodes 13-1, 13-2.

In this case, one problem is that the entrance node 12-2 has become unable to make use of its computational processing capacity, because there has been no sensor node managed by it. Another problem is that, if filtering was performed on both sensor data from sensor nodes 13-3, 13-4 managed together by the entrance node 12-1 before the relocation, the destination of these data is separated into the node 12-1 and the node 12-3 after the relocation and, thus, filtering of the data from the sensor nodes 13-3, 13-4 can only performed after collected to the data center. Of course, this may occur in a situation of FIG. 1 before the relation occurs. For example, filtering and the like could not be performed together for data from a sensor node 13-1 connected to the entrance node 12-1 and data from a sensor node 13-6 connected to the entrance node 12-3. The latter problem is due to the fact that there is no cooperation among the entrance nodes. However, if the sensor nodes are statically located, the problem would be resolved by considering deployment of the entrance nodes and allocation of the sensor nodes together with making effective use of the computational processing capabilities of the entrance nodes, as mentioned above.

In the present exemplary embodiment, this problem due to the relocation of the sensor nodes is resolved by means of cooperation among the entrance nodes and the sensor table shown in FIG. 6.

In a case that the connection destinations of the sensor nodes have altered from the state of FIG. 1 to the state of FIG. 2, the entrance nodes 12-1 and 12-3 having received communications from new sensor nodes receive management information for these sensor nodes by communicating with other entrance nodes known by them to exist in the neighborhood. More specifically, the entrance node 12-1 sends a query to the nodes 12-2 and 12-3 and the entrance node 12-3 sends a query to the nodes 12-1 and 12 2 about information for the sensor nodes 13-3 and 13-4 newly connected thereto. At this time, the entrance node 12-2 that managed the sensor nodes 13-3, 13-4 sends back information existing in its sensor table to the entrance nodes that sent the query, respectively.

The entrance nodes 12-1 and 12-3 having received the reply take over information about filtering processing that has so far been performed by the entrance node 12-2 by updating their sensor management tables. Also, it thus becomes unnecessary to send a query to an administrative node or the like existing in the data center 10 about the management of the sensor nodes.

Moreover, in the present exemplary embodiment, cooperative operation among plural entrance nodes is carried out by using the sensor table shown in FIG. 6. In FIG. 6, each entrance node holds a process item 660 for a sensor and information 670 for a node that executes the process, which are associated with each other and stored. Thereby, an entrance node holds not only process items for which it is responsible, also knows process items that are executed by other neighboring entrance nodes, so that it can get knowledge of some other entrance node that needs information for the sensor. Therefore, it becomes unnecessary to send a query to the data center.

In FIG. 6, it is assumed that an entrance node labeled EN1 holds this sensor table and nodes EN2, EN3 exist in its neighborhood. At this time, all data from sensors 1 to 4, namely, temperature sensors is transmitted to an IP address "100.xx.xx.1". At the same time, an average value of data from four sensors is calculated at EN1 as averaging 1. Further, it can be seen in "process item 2" that an average value for a given period of time for each temperature sensor is calculated at EN1. As for sensors 5 to 8, namely, humidity sensors, the destination IP address of their data is "100.xx.xx.2" and, moreover, averaging 2, which is averaging among humidity measurements, is performed. As for sensors 9 to 12, namely, vibration sensors, their sensor data is not transmitted to a particular IP address and compression processing on data from each of these sensors is executed at EN1. This is because, the vibration sensors are only assumed to send a larger amount of data than other sensors. As regards the vibration sensors, at the same time, information is specified that data from the sensors 9 and 10 is used for abnormality detection at EN2 and data from the sensors 11 and 12 is used for abnormality detection at EN3. Thus, EN1 receives and compresses vibration data from these sensors and also transfers this data to the corresponding EN2, EN3.

When an entrance node holds the table like this, if it receives data from a new sensor, it sends a query to other entrance nodes. The table is updated by receiving information existing in the management table of the source entrance node from which the sensor node moved. Here, the following description focuses on the behavior of the source entrance node from which the sensor node moved, instead of the entrance node to which the sensor node moved newly.

For example, a case where a sensor 4 associated with EN1 in FIG. 6 is moved to EN2 is considered. The sensor 4 is a sensor for which an averaging process and a time average calculation process on data from it have so far been performed at EN1. EN1 detects that no information has been arrived from the sensor. However, once the sensor has moved to a neighboring entrance node, a notification from the neighboring entrance node may sometimes arrive before the detection. This is because, to detect, for example, an abnormality occurred in the sensor for any reason such as a fault occurrence, EN1 knows it only after anticipated data transmission failed or communication failed a certain number of times. Consequently, in a situation where the sensor is moving, the neighboring entrance node, EN2 in this case, is likely to detect a new sensor not managed by EN2 and send a query to other entrance nodes at an earlier point of time. However, if the sensor node has placed in no response state due to a fault occurrence, not relocation, EN 1 having detected the abnormality normally requests the administrative node to make a decision.

When EN1 having received the query about the sensor 4 from EN2 finds the sensor with the relevant IP address existing in its table, EN1 sends back information about the sensor 4 it has to EN2. Thereby, EN2 shares the history and state of processing operation of EN1, i.e., what processes have been executed for the sensor 4 until now, and takes over the processes. According to an example of FIG. 6, it can be seen that "averaging 1" and "time average 4" have been executed. At this time, "time average 4" has so far been executed by EN1 based on data only from the sensor 4, whereas, for "averaging 1", EN1 has used data from other sensors 1 to 3, namely, temperature sensors. Thus, in this case, EN2 sends a query again to the entrance node that managed data from the sensors for "averaging 1" and performs allocation with respect to the data from the sensors.

This allocation is determined by the type and number of sensors managed by the entrance node and numeral allocation of sensors that are added and sensors that have already being managed. For example, on account of the fact that data from three of the four sensors is processed by EN1 and processing resources have been deployed at EN1 because EN1 has executed the process "averaging 1", EN2 is to transfer temperature data for averaging to EN1. On the other hand, "time average 4" is a computational process based on data only from the sensor 4 and EN2 takes over this process without transferring data.

Process allocation is configured, based on the loads of the entrance nodes, besides the number of sensors managed by each entrance node. For example, if EN2 is already responsible for quite a large number of computational processes and is put under a large load, allocation of filtering process items may be reconfigured between EN1 and a neighboring entrance node from a perspective of load distribution. For this reconfiguration, an entrance node may obtain the processing states of other entrance nodes and perform the reconfiguration or the data center or the administrative node may perform the reconfiguration.

By performing this reconfiguration of filtering processes, taking the loads into consideration, to an entrance node having surplus resources and processing performance because no sensor node managed by it has been missing, like the entrance node 12-2 in FIG. 2, other nodes may transfer a filtering process and data obtained from the sensors, so that the entrance node executes the process newly. In this way, effective use of processing resources throughout the system can be achieved.

In the example of FIG. 6, EN2 and EN3 receive data from vibration sensors and perform abnormality detection. The reason why these nodes do so is thought to be that an actuator for an alarm or the like to be operated upon detecting an abnormality is connected to EN2 and EN3, like the nodes 12-1 and 12-3 in FIG. 1. Like this, an entrance-node-specific condition may sometimes be a factor for determining which entrance node should execute a filtering process.

When an entrance node transfers data for filtering to another entrance node, it is conceivable to execute a pre-filtering process beforehand, depending on a filtering process item that is executed by the transfer destination node. By executing such process, more efficient use of network bandwidth and computational performance is possible, as compared with simple load balancing.

Figure 3:
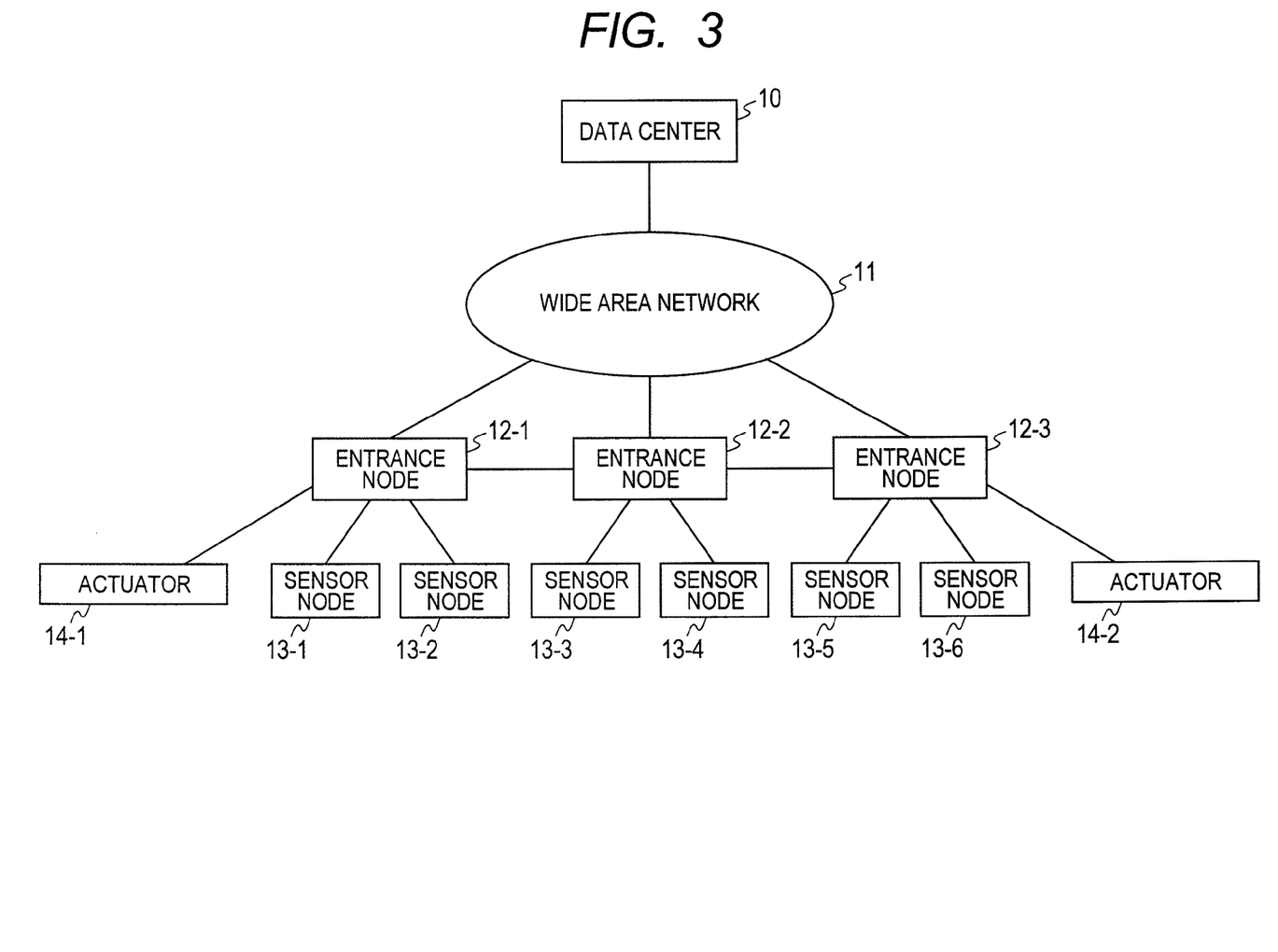
FIG. 3 is a diagram of a network system in which direct communication between entrance nodes is possible.

As shown in FIG. 3, all entrance nodes may be connected with dedicated lines between them, so that communication is performed between entrance nodes. These lines are not used for normal data transfer, but are used only for communication between entrance nodes in consequence of sensor node relocation and for transfer of data obtained from sensor nodes from one entrance node to another entrance node. This enables high-speed and reliable communication between entrance nodes without taking care of loops and without affecting the bandwidth of the wide area network 11 situated upstream. In particular, because a distance between entrance nodes from/to which a sensor node is anticipated to move is physically limited, it is conceivable that these nodes can be connected by a short-distance and high-speed line and, thus, its effect is expected to be high. By performing data transfer through this line, it is possible that an entrance node from which a sensor moved takes over the role of transfer, making an upstream network entity unaware of the sensor relocation.

Figure 7:
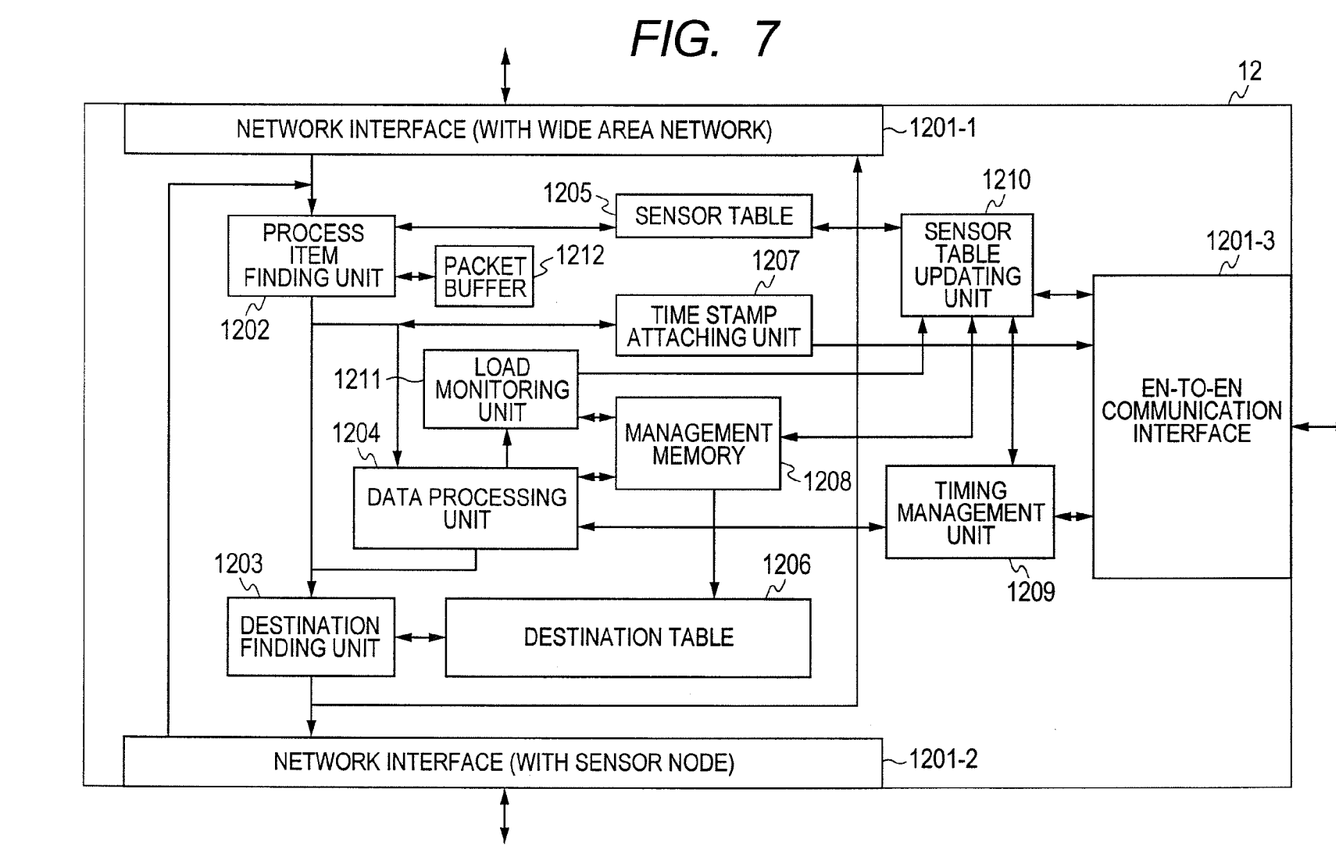
FIG. 7 is a diagram showing a structure of an entrance node.

FIG. 7 shows an example of an internal structure of an entrance node 12 which is a network node included in the system described above. The entrance node includes a network interface 1201-1 connecting to the wide area network as a network interface (1201) for connection to a network, a network interface 1201-2 for connection to a sensor node, and a network interface 1201-3 for EN-to-EN communication.

The entrance node further includes a process item finding unit (1202) that finds a process item from the contents of a packet, a destination finding unit (1203) that determines a destination to which data is to be transmitted, a data processing unit (1204) that executes computational processing using data from a sensor node, such as filtering, a sensor table (1205) for management of the addresses of sensors, a destination table (1206) for management of destination information, a time stamp attaching unit (1207) for attaching time stamp information to a received packet, a management memory (1208) for management of contents such as filtering processes and destinations, a timing management unit (1209) for reading timing information of a packet which is transmitted and received between ENs, and a sensor table updating unit (1210) that executes sending a query about sensor information to another EN and receiving its reply. Packets received from a sensor node and the wide area network via the respective network interfaces 1201 are passed to the process item finding unit 1202. Further, a load monitoring unit (1211) monitors the processing load of the data processing unit 1204 and has a role of updating load information per process to the management memory 1208 and sending a signal indicating a high load state to the sensor table updating unit 1210. There is also a packet buffer (1211) for holding a packet during an update of the sensor table and the management memory.

The process item finding unit 1202 refers to header information such as information for an input port of the traffic included in a packet and an IP address, searches the sensor table 1206 based on the header information, and decides how to handle the packet according to the search result.

By the decision, if the packet is to be transferred, the packet is directly sent to the destination finding unit 1203. By the decision, if it has been decided that a computational process such as filtering is needed, the packet is transferred to the data processing unit 1204. The data processing unit 1204, upon receiving the packet, determines a process item for the packet by searching the management memory 1208, executes the process identified by the determination, and then transfers the packet to the destination finding unit 1203. The destination finding unit 1203 receives the packet, searches the destination table 1206, and selects a destination by the search result.

Figure 10:
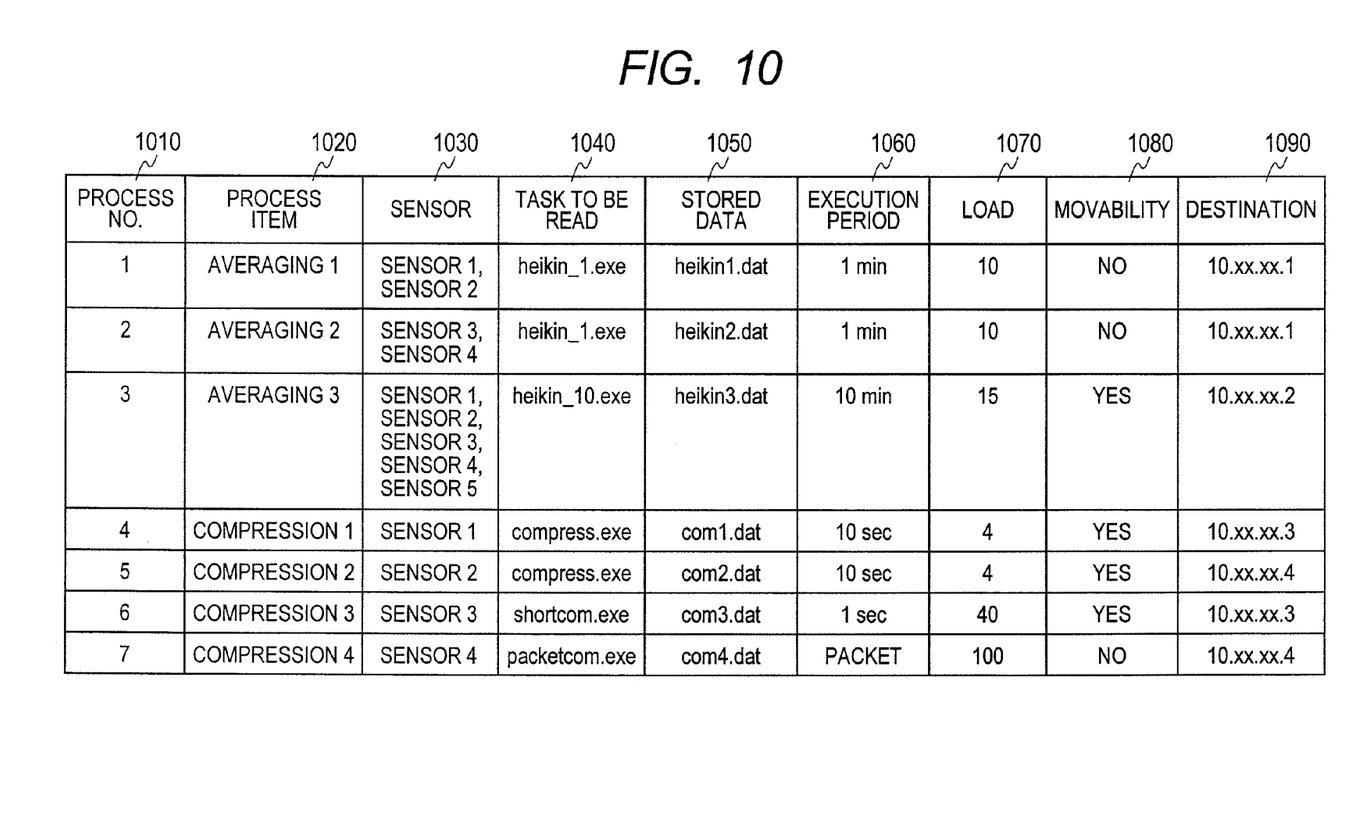
FIG. 10 is a diagram showing a table structure of a management memory.

The management memory 1208 has a table 1000 which is shown in FIG. 10. The table of the management memory includes a process No. (1010) for number management of each process, a process item 1020 representing a specific process name, a sensor designation 1030 of a sensor which is used for the process, a task designation 1040 of a task which is used for the process, stored data 1050 which is used for the process, an execution period 1060 of the process, the amount of a load 1070 measured in executing the process, movability 1080 indicating whether the process item can be moved, and destination information 1090 to which a result obtained by executing the process is to be sent.

Figure 8:
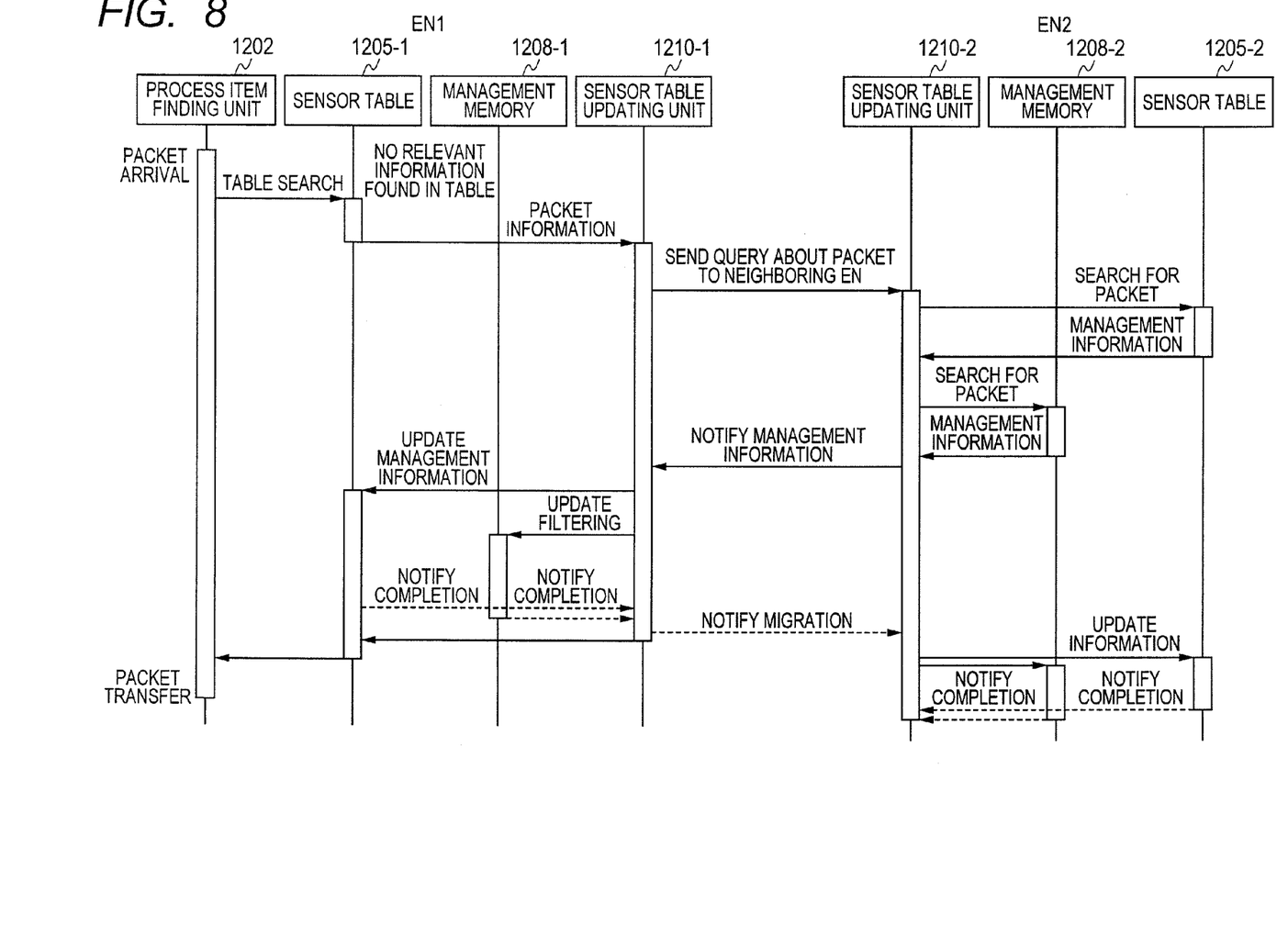
FIG. 8 is a sequence diagram of process contents.

FIG. 8 is a sequence diagram showing a process flow upon receiving a packet. The process item finding unit 1202 searches the sensor table 1205-1 to see whether a sensor designation, sensor type, connection port, and IP address included in the received packet are registered in the table. As a result of searching the sensor table 1205-1 by the process item finding unit 1202, if information included in the packet does not exist in the sensor table 1205-1, the process item finding unit 1202 requests the sensor table updating unit 1210-1 for a query about the non-existent information. The sensor table updating unit 1210-1 sends a query to some other entrance node existing in the neighborhood via the network interface for EN-to-EN communication to share information about a new sensor.

On the other hand, the some other entrance node having received the query from the sensor table updating unit 1210-1 likewise passes the message to its sensor table updating unit 1210-2. The sensor table updating unit 1210-2 searches the contents of the sensor table 1205 to check whether the sensor information exists in the table. If the relevant data exists in the sensor table, the sensor table updating unit 1210-2 searches the table of the management memory 1208-2 based on search criteria of a process item and obtains information for a process related to the packet. The sensor table updating unit 1210-2 sends back information including the load, movability, etc. of the process item existing in the table of the management memory 1208-2 to EN1.

The sensor table updating unit 1210-1 of the entrance node EN1 that sent the query, upon receiving the reply, updates the sensor table 1205-1 and the management memory 1208-1, based on the information contained in the reply. Then, the sensor table updating unit 1210-1 decides whether EN1 is to take over the filtering process or transfer data from a new sensor node that has just moved and attached to EN1, based on a combination of the information sent back from EN2 and the load information existing in the management table. This decision is also notified from the sensor table updating unit 1210-1 to the sensor table updating unit 1210-2 of the some other entrance node, so that rewriting of the sensor table 1205-2 and the management memory 1208-2 is performed. During the rewriting, a new entry is created in the sensor table 1205-1, the corresponding entry in the management table 1208-1 is migrated as is from EN2 to EN1, and the process item name and the load information are updated. Also, a handover of the relevant stored data is performed to take over the process item. After a series of these notifications, the sensor table updating unit 1210-1 instructs to send back transfer destination information to the process item finding unit 1202, based on the updated information in the sensor table 1205-1 and a packet transfer is executed by the process item finding unit 1202.

A flow is described in a case where the above decision is not to hand over the filtering process, instead, to transfer the packet received by the entrance node to some other entrance node. In this regard, for packet transfer, one way is transferring the packet without executing a filtering process on the packet and another way is transferring the packet after executing a filtering process on the packet.

When transferring the packet without executing a filtering process on the packet, the process item finding unit makes the transfer decision. The process item finding unit 1202 passes the packet together with the transfer destination information of the packet to the time stamp attaching unit 1207. After the time stamp attaching unit 1207 attaches to the packet time information (a time stamp) about timing at which the entrance node received that packet, the packet is transferred to an entrance node that is the destination of transfer via the network interface 1201-3 for EN-to-EN communication.

On the other hand, when transferring the packet after executing a filtering process on the packet, the data processing unit 1204 makes the transfer decision. The data processing unit 1204 executes a filtering process required for the packet to be transferred and then transfers the packet to the timing management unit 1209, and the timing management unit 1209 attaches time stamp information to the packet.

The entrance node having received the transferred packet through the network interface 1201-3 for EN-to-EN communication passes the packet to its timing management unit 1209. At this time, the timing management unit 1209 compares timing information with the transfer source entrance node and monitors for an incorrect order of arrival timing in a case where packets arrive from plural entrance nodes. Depending on a result of the monitoring, the timing management unit 1209 may perform the following action: storing packets, reordering packets, or discarding a packet. The timing management unit 1209 further passes the received packet to an intelligent processing unit 1204 and the intelligent processing unit 1204 executes a filtering process on this packet, while referring to information in the management memory 1208, as does for a normal packet.

The foregoing is description with regard to FIG. 7. In a case that dedicated network lines between entrance nodes do not exist, as in examples of FIG. 1 and FIG. 2, the network interface 1201-3 does not exist and all traffic to be transferred is transmitted and received through the destination finding unit and via the network interface 1201-1 with the wide area network.

Figure 9:
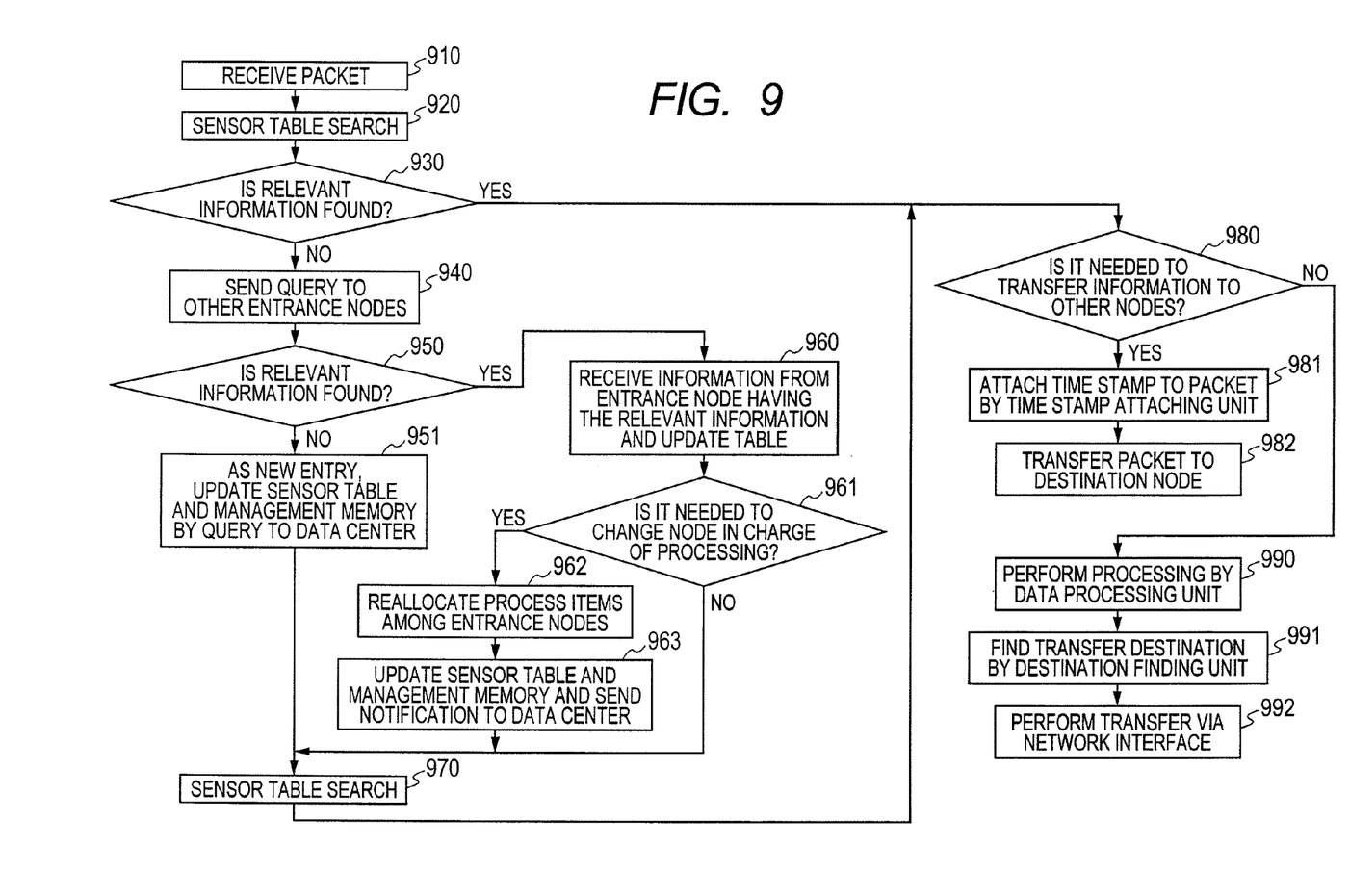
FIG. 9 is a flowchart of packet processing.

FIG. 9 is a flowchart of processing in an entrance node 12.

The process item finding unit 1202 of the entrance node 12-1 receives a packet from a sensor node (910). The process item finding unit 1202 searches the sensor table 1205-1 to see whether a sensor designation, sensor type, connection port, and IP address included in the received packet are registered in the table (920).

As a result of the search, if those are not registered in the sensor table 1205-1 (No, 930), the sensor table updating unit 1210-1 sends a query to other entrance nodes 12-2 and 12-3 via the network interface for EN-to-EN communication (930, 940).

In one or more other entrance nodes including an entrance node 12-2, having received the query, if relevant information has been found (Yes, 950) in at least one of these nodes, the entrance node 12-1 receives the relevant information from the entrance node having that information. Then, the entrance node 12-1 stores the received information into a new entry, respectively, in the sensor table and the management table. Further, based on information for a process item obtained, the entrance node 12-1 decides whether to change the entrance node in charge of processing (961). For example, the entrance node 12-1 obtains the loads of other entrance nodes 12-2, 12-3 and compares each of these loads with the load of the entrance node 12-1 itself. The entrance node 12-1 decides whether to change process allocation. For example, the process items for which the entrance nodes are responsible, respectively, may be interchanged for optimization for the purposes of equalizing the loads among the entrance nodes and reducing communication traffic. Allocation change decision may be made by, for example, sending a query to an entrance node having the right to make this decision or a database. By the decision, it is decided that changing the entrance node in charge of processing is needed (Yes, 961), the entrance node 12-1 notifies other entrance nodes of the change and reallocating process items among plural entrance nodes is performed (962).

The entrance node 12-1 refers to the sensor table and changes information for a processing node 670 in the entry of a process for which reallocation has been performed to that for an entrance node that has now become responsible for the process. The entrance node 12-1 also deletes the entry of a process in which it is no longer engaged from the management table (963). Further, the entrance node 12-1 notifies the data center that the entrance node in charge of processing changed. After finishing these updates or if no allocation change is needed (No, 961), the entrance node 12-1 searches the sensor table again (970).

On the other hand, if information about the input packet does not exist in other entrance nodes at step 950, the entrance node 12-1 regards it as a new entry and adds an entry related to the relevant sensor to the sensor table and the management table by, for example, sending a query to the data center (951). After thus creating a table entry related to a process item that is executed, searching the sensor table 970 is performed.

As a result of searching the sensor table (920), if information about the relevant input traffic exists in the sensor table (Yes, 930), as a result of searching the sensor table that has been updated 970, the entrance node 12-1 decides whether it is needed to transfer that information to other entrance nodes by referring to the processing node columns 670, 690 in the entry relevant to the sensor table (980). If transferring that information is needed (Yes, 980), the time stamp attaching unit of the entrance node 12-1 attaches a time stamp to the packet to be transferred (981). The packet attached with the time stamp is transferred to a transfer destination entrance node according to the processing node information referenced via the EN-to-EN communication interface 1201-3 (982).

If transferring that information to other nodes is not needed (980), a highly functional process is executed, as required, for the packet by the data processing unit (990), referring to the process item columns 660, 690 in the sensor table, and a transfer destination is searched for by the destination fining unit (991). Finally, transfer to the data center is performed via the network interface 1201-1 (992). The foregoing is description with regard to an exemplary first embodiment.

Second Embodiment

An exemplary second embodiment which is an example of modification to the exemplary first embodiment is then described.

Figure 4:
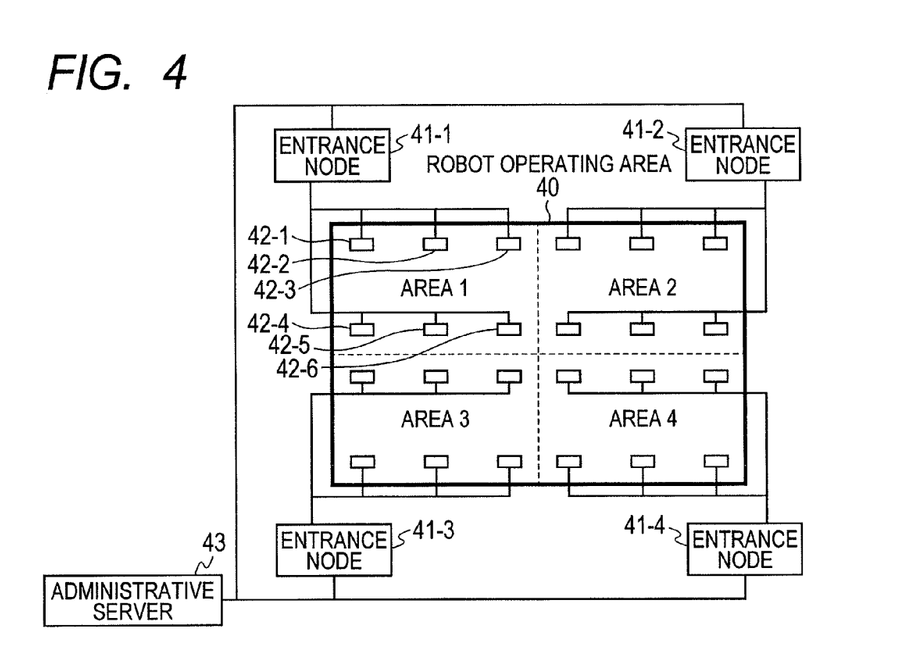
FIG. 4 is an overhead view of a robot operating area.

FIG. 4 shows a system structure in a factory. In the whole area shown, there are a robot operating area (40) for robot terminals to operate within it, entrance nodes (41), radio network base stations (42) operating in that area, and an administrative server (43) for integrated management of information from the entrance nodes 41. Besides, although not shown in FIG. 4, robot terminals, respectively, equipped with various types of sensors can move within this robot operating area 40. Thus, the robot terminals correspond to the sensor nodes in the exemplary first embodiment and send their sensed information to the entrance nodes (41) which are capable of radio communication with the robot terminals. Each entrance node has the structure shown in FIG. 7 with regard to the exemplary first embodiment and collects data from each robot by radio via the network interface 1201-2. Also, communication between the entrance nodes 41 is performed via EN-to-EN network interfaces 1201-3. Other processing details are the same as for the exemplary first embodiment.

In the management table 1000 of an entrance node, at this time, various types of processes for controlling robot operation such as controlling the front wheel and rear wheel motors of a robot, detecting an obstacle, preventing collision with another robot or something are added as entries. These various types of processes and other data including image data obtained by a camera 504 of each robot terminal 50 and temperature data measured by an environmental sensor are stored in the entries of the table of FIG. 6 and the table of FIG. 10, as is the case for the exemplary first embodiment.

According to the present exemplary embodiment, the robot operating area 40 is divided into four areas. The number of area divisions depends on the performances of the entrance nodes 41, the performances of the radio network base stations 42, the number of the robot terminals existing in the area, etc. A single entrance node 41 performs management of each divided robot operating area 40 and radio network base stations 42 within that area are also connected to the entrance node that performs the management of the area. Each of these radio network base stations 42 serves to transmit all received traffic to the entrance node and to transmit a signal from the entrance node to a robot terminal.

Figure 5:
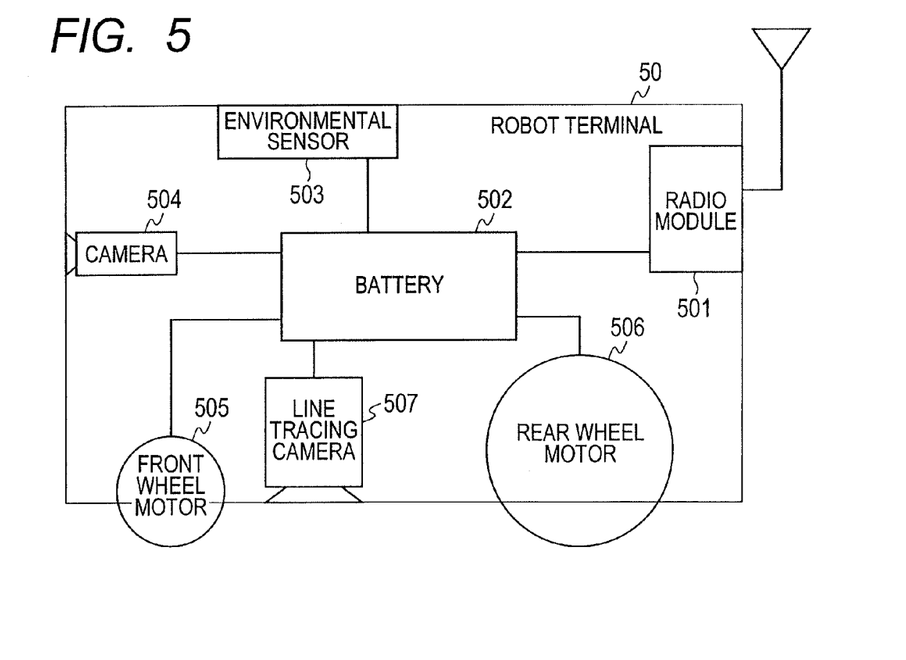
FIG. 5 is a schematic diagram of a robot equipped with a sensor.

A robot terminal (5) which is shown in FIG. 5 is configured with a radio module (501), a battery (502), an environmental sensor (503), a camera (504), a front wheel motor (505), a rear wheel motor (506), and a line tracing camera (507). The radio module serves to communicate with a radio network base station 42 deployed in the area and is also used for detecting location information by measuring a delay between signals from plural radio network base stations 42 at the entrance node 41. The battery 502 is a rechargeable battery for driving the whole robot; in addition to supplying power throughout the robot terminal, the battery monitors its remaining amount of power and notifies it to the entrance node 41.

The environmental sensor 503, by collecting information about environment such as temperature information inside and around the robot, is used to collect environmental information within the robot operating area and detect an abnormality such as overheat of a single robot unit. The camera 504 is a camera disposed in the front of the terminal and is used to detect an obstacle or another robot terminal from image data captured by it in a travel direction of the terminal. The front wheel motor 505 and the rear wheel motor 506 are used to move the robot. The line tracing camera 507 is a camera for recognizing basic course index lines drawn on the floor so that the robot can locate its position and move.

Control of a robot terminal 50 is complex and diverse and, therefore, is implemented in such a manner that the burden for control is shared by plural entrance nodes 41. While an individual entrance node is responsible for control of an individual robot, it is preferable that the entrance nodes communicate with each other as required. There is a process item that is processed by an entrance node itself; a process as described in step 990 in FIG. 9 corresponds to this. On the other hand, information for the battery's remaining amount and information such as a use rate of a power feeding station are preferably managed by a single entrance node in an integrated fashion. This corresponds to a process as described in steps 981, 982 in FIG. 9.

In a case where many robot terminals have come together in a particular area, the entrance nodes communicate with each other for load distribution processing, e.g., entrusting control to an entrance node that supervises another area. This load distribution processing corresponds to a process as described in steps 961, 962, 963 in FIG. 9. For load distribution, each entrance node calculates integral values of the execution periods and the amounts of load of the processes for which each node is responsible and notifies the integral values to each other. Based on relative comparison of the integral values, a process item and its processing node are determined, also taking a data route or the like into consideration. There is a need for combining plural pieces of information obtained by various types of sensors regarding control that manages basic robot operation. Hence, it is more efficient that a single entrance node processes a set of such pieces of information per robot. Such information set obtained by sensors includes location information of the radio module 501, images captured by the camera 504 and the line tracing camera 507, management of the operations of the front wheel motor 505 and the rear wheel motor 506, etc.

In a conceivable manner, as for a set of information obtained by the sensors on a robot, an entrance node nearest to the robot is preferentially responsible of processing the set of information. In this case, "movability" 1080 is set to "yes" in the entry as to the relevant process in the management table 1000. The entrance node 12 refers to the "movability" flag 1080 in the relevant entry in the management table and it hands over the entry including the process item to another entrance node, when the robot has moved into a different entrance node's area across the boundary of the area. At this time, if the robot mobility between different areas is less frequent and if the robot is less likely to return after having once moved, an effect of reducing the frequency of communication between entrance nodes can be obtained. A migration process at this time corresponds to steps 961, 962, 963 in FIG. 9.

In another conceivable manner, a single entrance node is statically responsible for processing per robot. In this case, "movability" 1080 is set to "no" in the entry as to the relevant process in the management table 1000. According to this manner, even when the robot has moved out of the area, the entrance node gets information from the robot terminal 50 via another entrance node. Therefore, there is an advantage that it is not needed to hand over the processing responsibility itself between entrance nodes. That is, this is a manner represented in FIG. 9 such that allocation is not changed in step 961 and processing is only done by packet transfer to other entrance nodes in steps 981, 982.

Alternatively, by jointly managing robot control information by plural entrance nodes, processing is performed using data shared in the sensor table and the management table for location management such as preventing collision between plural robots and a control handover when a robot moves from one area to another area. According to this manner, management of a robot located near to a boundary between plural areas is implemented by sharing information and control process items for the robot by the entrance nodes supervising these areas.

On the other hand, because of a positional factor other than robots, there is a process that is preferably executed by a particular entrance node. For example, management of battery charging states is performed by an entrance node that supervises an area in which a charging stand is situated. The entrance node collects the use state of the battery charging stand and the battery use states of all terminals. Accordingly, to this entrance node, all other entrance nodes transmit battery information collected by them. Such transmission corresponds to a process as described in steps 981 and 982 in FIG. 9.

As another item to be monitored, there is environmental information that is collected by environmental sensors. For these pieces of information, after their data amount is once reduced by filtering or other manipulation at each entrance node, the information is transmitted to a particular entrance node for executing abnormality monitoring. In some cases, the entrance node that executes abnormality monitoring may be an entrance node to which any type of actuator for warning of a specific abnormality is associated. In another case, an entrance node having the least load may simply be chosen as such entrance node. Terminals other than the particular entrance node transmit data that is used for abnormality monitoring to the particular entrance node through a process as described in steps 981 and 982 in FIG. 9.

The invention claimed is:

1. A network system comprising:
   an information processing device that manages status of an object to be monitored;
   a plurality of sensing devices that senses information of the object to be monitored; and
   a first network node that receives a packet from at least one of the sensing devices, decides whether a node that executes a computational process on information in the packet is identifiable, and, if it has been decided that such node is not identifiable, sends a query about the computational process on the information in the packet to some other node;
   wherein the some other node is a second network node connected to the information processing device via a network and is configured to communicate with at least one of the sensing devices, and
   wherein the first network node receives a reply to the query from the second network node and decides which network node should execute the computational process on the packet, based on a load of the second network node included in the reply and a load of the first network node itself.

2. The network system according to claim 1,
   wherein the some other node is the second network node connected to the information processing device via the network and is configured to communicate with at least one of the sensing devices, and
   wherein the first network node receives a reply to the query from the second network node and executes the computational process relevant to the packet, based on the reply.

3. The network system according to claim 2,
   wherein the computational process is a computational process to be executed on a plurality of packets, and
   wherein the first network node receives the reply including a history of pervious computational processes and executes the computational process based on the history of computational processes and the packets.

4. The network system according to claim 3,
   wherein the first network node transmits a result of the execution of the computational process to the information processing device.

5. The network system according to claim 4,
   wherein the packet includes information sensed by a sensor with respect to the object to be monitored, and
   wherein the computational process is to be executed on the information sensed by the sensor.

6. The network system according to claim 1,
   wherein the first network node transmits the packet to the second network node.

7. The network system according to claim 6,
   wherein the first network node stores information for a transfer destination of the packet.

8. The network system according to claim 1,
   wherein the first network node holds information about a network node that executes the computational process on the packet according to the decision and transfers a further received packet based on the held information.

9. A packet processing method in any one of a plurality of network nodes configured to execute a computational process on a packet, comprising:
   receiving data obtained by sensing an object to be monitored from a sensing device;
   deciding whether a process to be executed on the data is allocated;
   if the process is not allocated, sending a query to some other network node;
   deciding whether to transfer the packet to the some other network node or allocate a computational process on the packet to the network node itself according to a result of the query; and
   executing the packet processing according to the decision;
   wherein the some other node is a second network node connected to an information processing device via a network and is configured to communicate with at least one of the sensing devices, and
   wherein the first network node receives a reply to the query from the second network node and decides which network node should execute the computational process on the packet, based on a load of the second network node included in the reply and a load of the first network node itself.

10. A network node comprising:
    a first network interface that is connected to a sensor node via a first network;
    a second network interface that is connected to an information processing device via a second network;
    a third interface;
    a storage unit for storing information about a computational process on information included in a packet; and
    a control unit that, when the packet has been transmitted by the sensor node and if information included in the packet is not stored in the storage unit, sends a query to some other network node via the third interface and decides whether to entrust the computational process on the packet to the some other network node or execute the computational process by itself according to a reply to the query;
    wherein the some other node is a second network node connected to the information processing device via a network and is configured to communicate with at least one of the sensing devices, and
    wherein the first network node receives a reply to the query from the second network node and decides which network node should execute the computational process on the packet, based on a load of the second network node included in the reply and a load of the first network node itself.

* * * * *